US006431643B2

(12) United States Patent
Grey

(10) Patent No.: US 6,431,643 B2
(45) Date of Patent: Aug. 13, 2002

(54) MOTOR VEHICLE GRAB HANDLE

(75) Inventor: Jason John Grey, Gloucester (GB)

(73) Assignee: Jaguar Cars Limited, Coventry (GB)

( * ) Notice: Subject to any disclaimer, the term of this patent is extended or adjusted under 35 U.S.C. 154(b) by 0 days.

(21) Appl. No.: 09/772,167

(22) Filed: Jan. 29, 2001

(30) Foreign Application Priority Data

Feb. 3, 2000 (GB) .............................................. 0002363

(51) Int. Cl.7 ................................................ B60R 13/02
(52) U.S. Cl. ........................ 296/214; 296/71; 105/354; 16/405; 16/110.1
(58) Field of Search ................................ 296/214, 93.1, 296/71; 105/354; 16/405, 408, 114.1, 110.1, 429, 444, 445

(56) References Cited

U.S. PATENT DOCUMENTS

| 5,855,408 A | 1/1999 | Rickabus .................... 296/214 |
| 6,076,233 A | * 6/2000 | Sasaki et al. ................. 16/444 |

FOREIGN PATENT DOCUMENTS

| DE | 42 12 291 A1 | 10/1993 | ............ E05B/17/22 |
| DE | 198 23 314 A1 | 12/1998 | ............ B60R/16/02 |
| DE | 197 31 325 A1 | 1/1999 | ............ E05B/65/26 |
| DE | 197 47 703 A1 | 5/1999 | ............ B60N/3/02 |

* cited by examiner

Primary Examiner—Joseph D. Pape
(74) Attorney, Agent, or Firm—Davis & Bujold, P.L.L.C.

(57) ABSTRACT

A motor vehicle (1) with a grab handle (6), for a passenger compartment (12). The grab handle (6) is secured to a support, such as a roof panel (14), via a pair of pivot points (16) so that the grab handle (6) may be rotated (3) to extend away from the surrounding surface (10) to an extended position (31) or retracted toward the surrounding surface (10) to a retracted position (11). A proximity sensor (24) senses the presence of a hand when sufficiently near the grab handle (6), and an actuator, responsive to the proximity sensor, is arranged to extend (3) automatically the grab handle (6) when the proximity sensor (24) senses the presence of a hand near the grab handle (6). The actuator may also automatically retract the grab handle (6) when the proximity sensor (24) does not sense the presence of a hand near the grab handle (6) for a predetermined period of time.

20 Claims, 4 Drawing Sheets

MOTOR VEHICLE GRAB HANDLE

FIELD OF THE INVENTION

The present invention relates to a grab handle for a passenger compartment of a motor vehicle.

BACKGROUND OF THE INVENTION

Grab handles are common in motor vehicles. For example, in a motor car, there may be three grab handles inside the passenger compartment projecting in use generally downwards from the headlining above three passenger doors. Unfortunately, the grab handles can restrict the head space inside the passenger compartment. Therefore, it is known to provide a grab handle which is hinged to the passenger compartment ceiling, and spring loaded so as to retract against the headlining when not in use. A passenger may then pull the grab handle downward and hold on to this as required during travel within the motor vehicle or when entering into or exiting from the motor vehicle. However, it can often be difficult to grab hold of such a grab handle when a passenger enters the vehicle.

One problem with such retracting hinged grab handles is that there is an inevitable compromise between how flush the grab handle is with the headlining, and how easy it is for a passenger to grab hold of the grab handle. Although a passenger may have plenty of time to grab hold of the grab handle, when entering into or leaving from the passenger compartment, it may be more difficult to pull down the grab handle quickly while the vehicle is moving, as may be required if the vehicle suddenly corners.

SUMMARY OF THE INVENTION

Wherefore it is an object of the present invention to overcome the above noted drawbacks associated with the prior art grab handles.

It is a further object of the present invention to provide a more convenient grab handle for a motor vehicle.

Accordingly, the invention provides a motor vehicle comprising: a grab handle; a surface within a compartment of the vehicle, the surface extending about the grab handle; a handle support, the grab handle being movably attached to the support so that the grab handle may be extended away from the surface to an extended position or retracted toward the surface to a retracted position; a proximity sensor for sensing the presence of a hand near the grab handle; and an actuator for moving the grab handle, the actuator being responsive to the proximity sensor; wherein the actuator automatically extends the grab handle when the proximity sensor senses the presence of a hand near the grab handle.

The grab handle is, therefore, automatically made available when it is needed. In addition, there is no need for a button or some other form of manual release to extend the grab handle. This is convenient for users of a grab handle, particularly at night when is may be difficult to see, touch or activate such a manual release mechanism.

Preferably, the actuator also automatically retracts the grab handle when the proximity sensor does not sense the presence of a hand near the grab handle.

The surface may be within a passenger compartment of the vehicle, or other vehicle compartment, such as the car's trunk. If the grab handle is above a seated passenger, then the grab handle may be above a door or a window, extending generally downward from a headlining. Other examples of grab handles are handles in the backs of seats, or extending from a pillar that extend to the roof of the vehicle.

The proximity sensor may be incorporated in a surface adjacent the grab handle, but preferably the proximity sensor is located within the grab handle.

The support may be a structural member of the motor vehicle, for example a roof panel or a side pillar extending to the roof. The support may, however, be a solid but non-structural component, such as a seat back for example.

The actuator may be electrically powered in both directions of movement. According to one embodiment of the invention, however, the actuator is electrically powered in just one direction, and then returned in the opposite direction under the action of a mechanically or pneumatically powered actuator which stores energy from the electrically powered motion, and which applies a biasing force to the grab handle.

In one embodiment, the actuator is electrically powered, for example by a small electrical motor or a solenoid, to drive the grab handle toward the retracted position when the proximity sensor no longer senses the presence of a hand near the grab handle. It is not necessary for the actuator to be electrically powered in the opposite direction. For example, the actuator may bias the grab handle toward the extended position with the grab handle being retained in the retracted position by a retention mechanism which is released when the proximity sensor senses a hand is near the grab handle.

According to another embodiment, the actuator is electrically powered to drive the grab handle toward its extended position when the proximity sensor senses the presence of a hand near the grab handle. Once this has occurred, the actuator then biases the grab handle toward the retracted position while the grab handle is retained in the extended position by a retention mechanism and the retention mechanism releases the grab handle when the proximity sensor no longer senses a hand near the grab handle for a predetermined period of time.

The bias may be a spring bias provided by a spring mechanism that is loaded by the electrically powered movement toward either the retracted position or the extended position. A spring can therefore be used to store energy from an electrical motor used to extend the grab handle when use of the grab handle is desired.

The retention mechanism may be a catch, which is automatically released in response to the presence or the absence of a hand detected by the proximity sensor.

In either case, the actuator may comprise a damper to control movement of the grab handle toward the extended position or the retracted position under the action of the biasing force.

The actuator need not, however, be automatically moved in both directions. For example, if the grab handle is automatically moved to the extended position, then the grab handle may be manually retracted by pressing the grab handle toward the surface. This may allow some cost savings in the construction of the actuator.

If the actuator both automatically extends the grab handle, when the proximity sensor senses the presence of a hand near the grab handle, and automatically retracts the grab handle, when the proximity sensor does not sense the presence of a hand nea[00f8] the grab handle, preferably the extension of the grab handle is quicke[00f8] than the retraction of the grab handle. This has the advantage that the grab handle is quickly made available when it is needed by a passenger, and reduces the possibility that some object may inadvertently be trapped behind the grab handle when this is being retracted, by giving additional time for the object to be removed.

One advantage to biasing the grab handle into the retracted position is that the retraction motion can be essentially passive. Therefore, if a hand or other object is located behind the grab handle, when it is being retracted, the force that can be applied is limited. This essentially eliminates the possibility of on a hand, object or other item being trapped by the automatic retraction motion of the grab handle.

The grab handle can be made flush with the surface when the grab handle is in the retracted position. This prevents the grab handle from being manually pulled out to an extended position. The flush arrangement may also provide some safety benefit because of the possible risk associated with any object projecting into a passenger compartment against which a passenger may come into contact during a collision.

The grab handle can be designed to retract as soon as a hand is no longer sensed proximate to the grab handle, but it is preferable to avoid premature retraction of the grab handle during a time interval, following removal of the hand from grab handle, during which a person may again wish to grab hold of the grab handle again. Therefore, the grab handle is preferably moved to the retracted position only once the sensor no longer senses a hand near the grab handle for a predetermined time delay. The time delay may be between about one to ten seconds, or so.

The time delay may be lengthened for situations where a passenger is likely to grab hold of the grab handle, for example when a door located near the grab handle is opened during the time delay.

BRIEF DESCRIPTION OF THE FIGURES

The invention will now be described by way of example, with reference to the accompanying drawings, wherein.

DETAILED DESCRIPTION OF THE INVENTION

Figure 1:
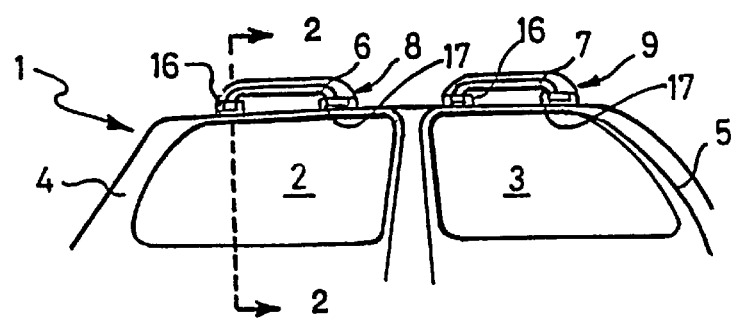
FIG. 1 is a diagrammatic view of a portion of an interior of a motor vehicle passenger compartment showing two passenger side windows each of which has a grab handle, according to the invention, positioned above a window.
Figure 2:
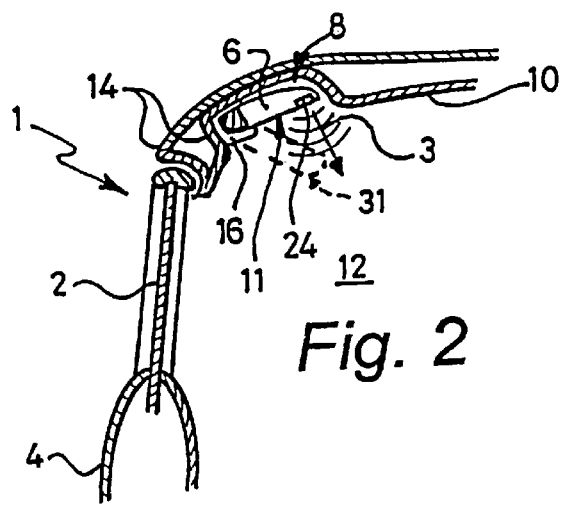
FIG. 2 shows a diagrammatic view through a section of the motor vehicle of FIG. 1 taken along section line 2-2 of FIG. 1.

FIGS. 1 and 2 show views of a portion of an interior of a motor vehicle 1, such as a motor car, having two passenger side windows 2, 3 supported by passenger doors 4, 5 of the vehicle 1. A grab handle 6, 7 is located above each one of the two window 2, 3. Each grab handle 6, 7 is located within a respective recess 8, 9 formed in a headlining 10 of the passenger compartment 12 of the vehicle 1. A steel box channel 14 (FIG. 2), which runs the entire length of the headlining 10 above the passenger doors 4, 5, provides a secure support for each one of the grab handles 6, 7.

Figure 3A:
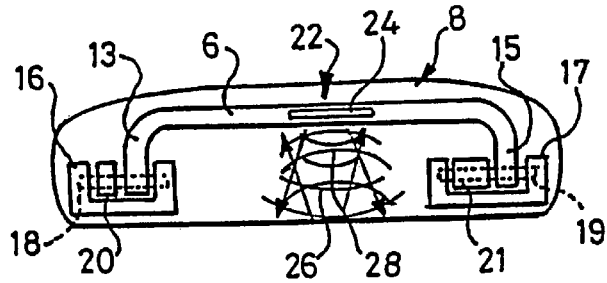
FIG. 3A is a diagrammatic view of the grab handle according to a first embodiment of the invention.

Each grab handle 6, 7 has a wide elongate U-shaped configuration to facilitate grasping by a passenger, and the free ends of each of the arms 13, 15 of the grab handle 6, 7 are pivotally attached to the box channel 14 by a respective bracket 16, 17, as shown more clearly in FIG. 3A. According to this arrangement, each grab handle 6, 7 can, therefore, rotate from a retracted position 11 (FIG. 2), located within the respective recess 8 or 9, to extend from the headlining 10 downward and inward to an extended position 31 in the passenger compartment 12, as shown in phantom in FIG. 2.

Figure 3B:
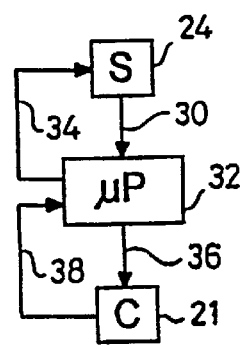
FIG. 3B is a block schematic showing how the grab handle of FIG. 3A is controlled.

Referring now to FIGS. 3A and 3B, the arms 13, 15 of each U-shaped grab handle 6, 7 are pivotally connected, by an axle or shaft 18, 19, to a corresponding U-shaped bracket 16, 17. One of the axles or shafts 18 has a coil spring mechanism 20 which spring biases the grab handle 6 downward into the extended position 31. The second axle or shaft 19 is connected to a retention mechanism, here an activatable catch 21, that retains the grab handle 6 in the retracted position 11 but which can be activated to release the axle or shaft 19, and hence the grab handle 6 out of and away from the recess 8 so that the grab handle 6 extends into the passenger compartment 12 under the action of the spring 20. A central portion 22 of the grab handle 6 has an ultrasonic sensor 24 that periodically directs ultrasonic waves 26 into the passenger compartment 12. Any ultrasonic wave(s) that is reflected 28 back from the passenger compartment waves 28 have a sufficient intensity, then this is a good indication that a passenger of the vehicle has his or her hand (not shown) located sufficiently proximate to the grab handle 6.

Figure 3C:
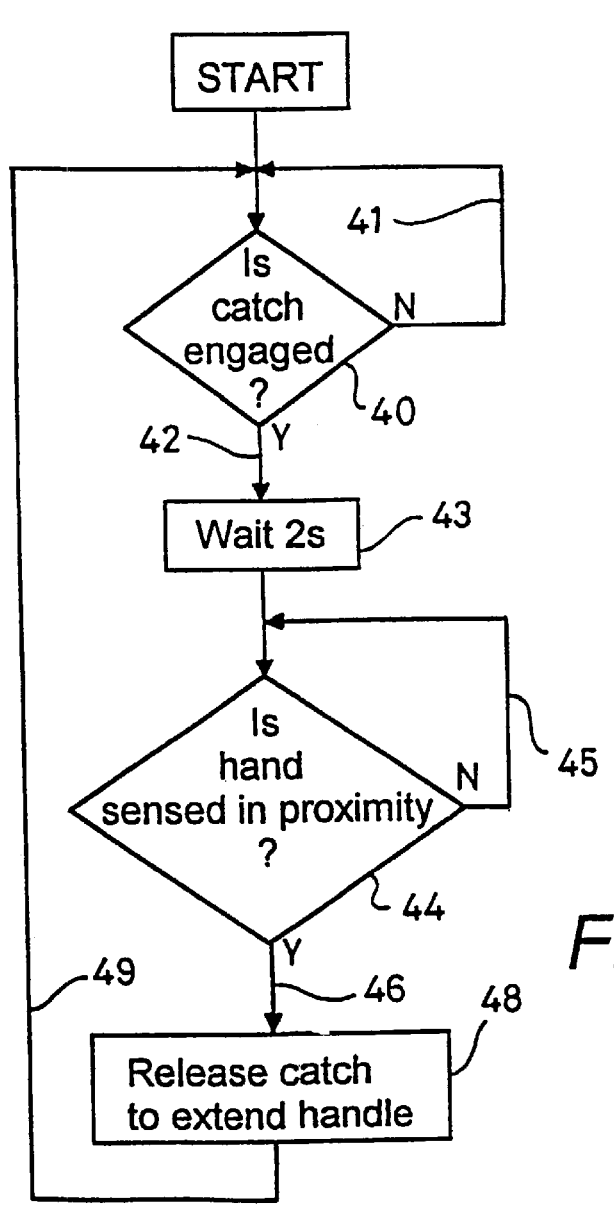
FIG. 3C is a flow chart showing how the grab handle of FIG. 3A operates.

FIGS. 3B and 3C show how the grab handle 6 is arranged to extend automatically when the ultrasonic sensor 24 senses the presence of a hand sufficiently near or adjacent the grab handle 6. The grab handle 6 operates under the control of a microprocessor 32 which receives a signal 30, from the ultrasonic sensor 24, indicating the strength of any reflected ultrasonic waves 28. The microprocessor 32 also receives a signal 38 from the catch 21 indicating whether or not the catch 21 is engaged or disengaged with the grab handle 6. The microprocessor 32 includes control software that first tests, at step 40 (FIG. 3C), whether or not the catch 21 is engaged. If the catch 21 is not engaged, then this indicates that the grab handle 6 is extended and thus the computer software loops back, at 41, and again tests, at step 40, whether or not the catch is engaged. If a passenger has pressed or forced the grab handle 6 back up into the recess 8, then the catch 21 will become engaged with the grab handle 6 and, once the microprocessor 32 detects that this is the case, at 42, the computer software waits a period of time, at step 43, e.g. two seconds, before again determining, at step 44 from the signal 30 received from the ultrasonic sensor 24, whether or not a hand is sensed sufficiently near or proximate to the grab handle 6. If a hand is not sensed sufficiently near or proximate to the grab handle 6, then the computer program again loops back, at 45, to test whether or not a hand is sensed sufficiently near or proximate to the grab handle 6 via the ultrasonic sensor 24.

In the event that a hand is again sensed sufficiently near or proximate to the grab handle 6 at 46, then the microprocessor 32 sends, at step 48, a control signal 36 to the catch 21 to release the catch. The grab handle 6 then extends, under the action of the coil spring 20, downward from the headlining 10 into the interior compartment for use. The computer software then loops back, at 49, to step 40 to again test whether or not the catch 21 is engaged. When a passenger no longer needs to use the grab handle 6, then he or she can press or force the grab handle 6 back up into the recess 8 where it will again be automatically secured in the retracted position by the catch 21.

Figure 4A:
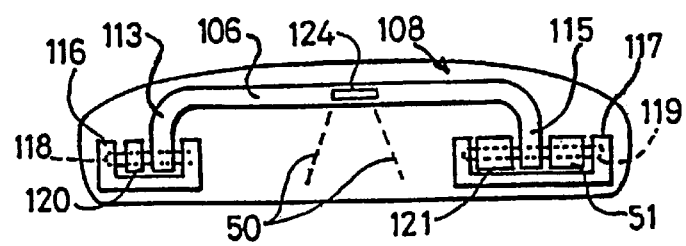
FIG. 4A is a diagrammatic view of a grab handle according to a second embodiment of the invention.
Figure 4B:
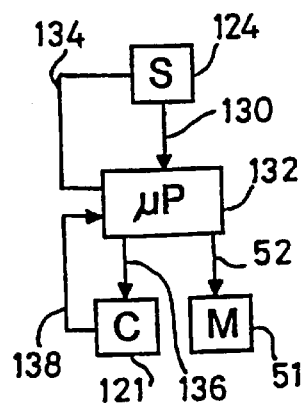
FIG. 4B is a block schematic showing how the grab handle of FIG. 4A is controlled.

FIGS. 4A and 4B show a second embodiment of a grab handle 106, where components similar to the components of the first embodiment shown incremented by 100. According to this embodiment, the grab handle 106 has a capacitance sensor 124 which uses an electric field 50 to sense or detect the presence of an object, such as a hand of a passenger, sufficiently near or adjacent the grab handle 106. The sensor 124 provides an output signal 130 to a microprocessor 132 which is indicative of an object microprocessor 132 also controls 134 operation of the sensor 124. The grab handle 106 is connected to two U-shaped brackets 116, 117 via two corresponding axles or shafts 118, 119. One of the axles or shafts 118 is biased by a coil spring 120 to return the grab handle 106 upward back into a retracted position located within the recess 108. The second axle or shaft 119 has a catch mechanism 121 that retains the axle or shaft 119, and hence the grab handle 106, in an extended downward position. The grab handle 106 is moved, via an electric motor 51 connected to one of the axles or shafts 119, from a retracted position in which the grab handle 106 is retracted within the recess 108 into an extended position where the grab handle 106 extends downward and inward into the passenger compartment 12. In the event that the microprocessor 132 determines that a hand of a passenger is sufficiently near or proximate to the grab handle 106, then the microprocessor 132 sends a control signal 52 to the motor 51 to rotate the grab handle 106 to the extended position 31.

Figure 4C:
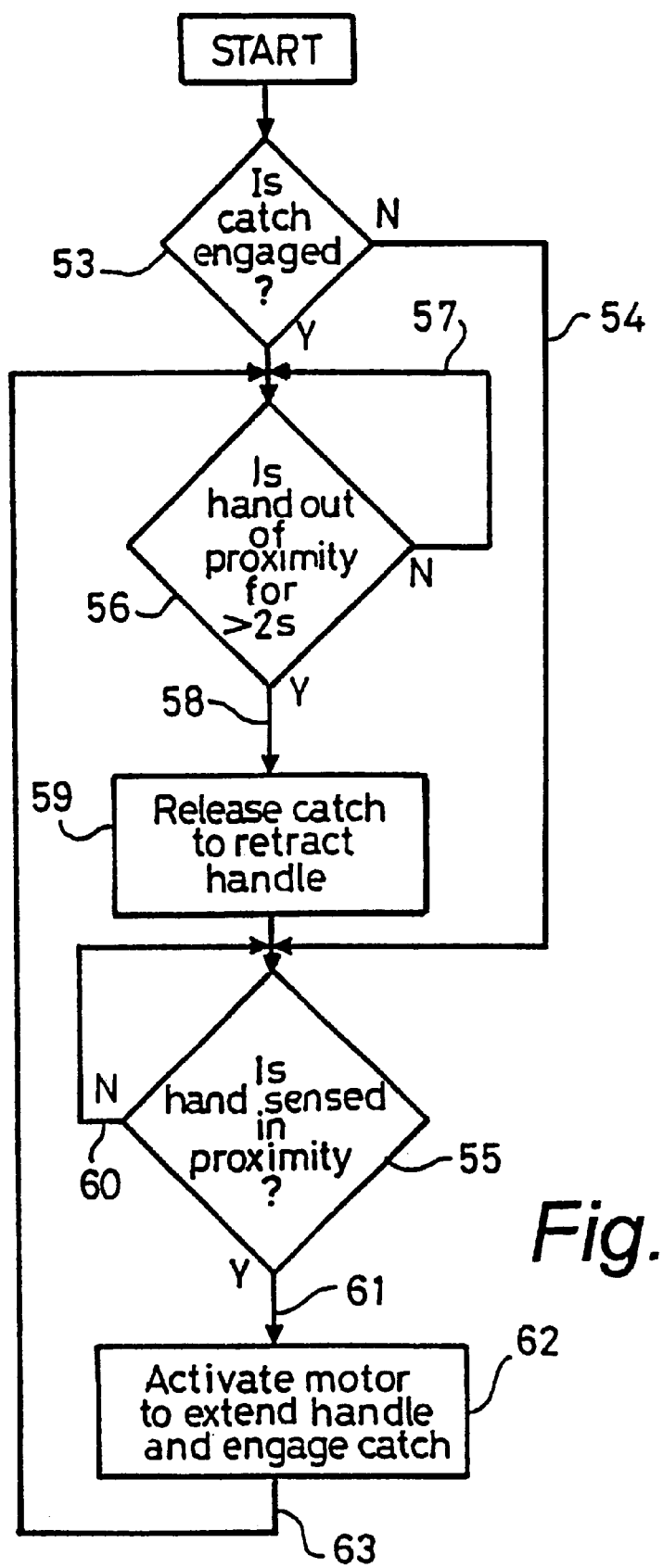
FIG. 4C is a flow chart showing how the grab handle of FIG. 4A operates.

The operation of the grab handle 106, under the control of the microprocessor 132, is shown in FIG. 4C. The microprocessor 132 first tests, at step 53 from a signal 138 received from the catch 121, whether or not the catch 121 is engaged. If the catch 121 is not engaged, then this indicates that the grab handle 106 is retracted within the recess 108 and thus the computer software, running within the microprocessor 132, next loops at 54 to test, at step 55, whether or not a hand is sensed sufficiently near or proximate to the grab handle 106. Otherwise, if the catch 121 is engaged, the microprocessor 132 tests, at step 56 from the signal 130 received from the capacitance sensor 124, whether or not a hand has been out of proximity to the sensor 124 for more than two seconds. If the hand has not been out of proximity to the sensor 124 for more than two seconds, then the computer software loops back, at 57, to again test, at step 56, whether or not a hand has been out of proximity to the sensor 124 for more than two seconds. Otherwise, if the hand has been out of proximity to the grab handle 106 for more than two seconds, then the microprocessor 132 proceeds, at 58, and sends a control signal 136 to the catch 121, at step 59, to release the catch 121 in order to retract the grab handle 106.

The computer software then proceeds to test, at step 55, whether or not a hand has been sensed sufficiently near or proximate to the capacitance sensor 124. If no hand has been sensed, then the computer software loops back, at 60, to again repeat this test at step 55. Otherwise, if a hand has been sensed sufficiently near or proximate to the capacitance sensor 124, then the microprocessor 132 sends a control signal 52, at step 62, to the electric motor 51 to drive the motor 51 and hence the grab handle 106 out of the recess 108 into the extended position where a passenger may grab the grab handle 106. The computer software then loops back, at 63, to test again, at step 56, whether or not a hand has been out of proximity to the sensor 124 for more than two seconds.

Figure 5A:
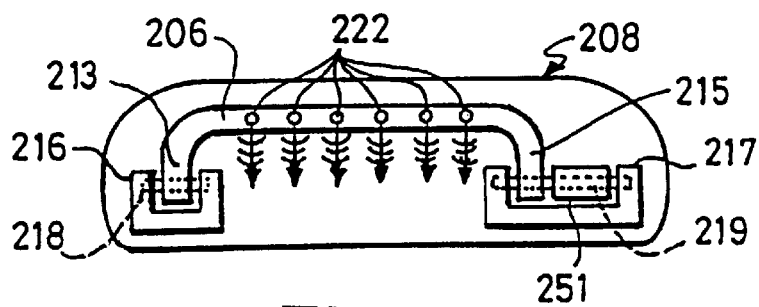
FIG. 5A is a diagrammatic view of a grab handle according to a third embodiment of the invention.
Figure 5B:
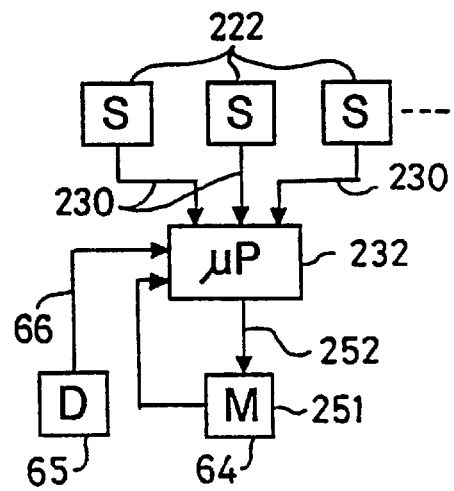
FIG. 5B is a block schematic showing how the grab handle of FIG. 5A is controlled.

FIGS. 5A and 5B show a third embodiment of the invention in which components similar to those in the previous embodiments are indicated by reference numerals incremented by 200. The grab handle 206, according to this embodiment, has six infrared sensors 222 arranged and spaced along a length of the grab handle 206. Each one of the infrared sensors 222 contains both an infrared transmitter and an infrared receiver, with the receiver arranged to detect scattered or reflected infrared light when a hand is located sufficiently near or proximate to the grab handle 206. Each sensor 222 sends an output signal 230 to a microprocessor 232 which is indicative of whether or not a hand is sufficiently near or proximate to the grab handle 206. The grab handle 206 has two opposed arms 213, 215 which are each connected to a respective U-shaped bracket 216, 217 via two corresponding axles or shafts 218, 219. According to this embodiment, a first one of the axles or shafts 218 is free to rotate, while the second axle or shaft 219 is driven by an electric motor 251 that also provides an output signal 64 to the microprocessor 232 that indicates whether or not the motor 251 has driven the axle or shaft 219 either to retract the grab handle 206 into the recess 208, or to driven the axle or shaft 219 to extend the grab handle 206 downward to project into the passenger compartment 12.

The microprocessor 232 also receives a signal 66, from a door sensor grab handle 206, is either opened or closed.

Figure 5C:
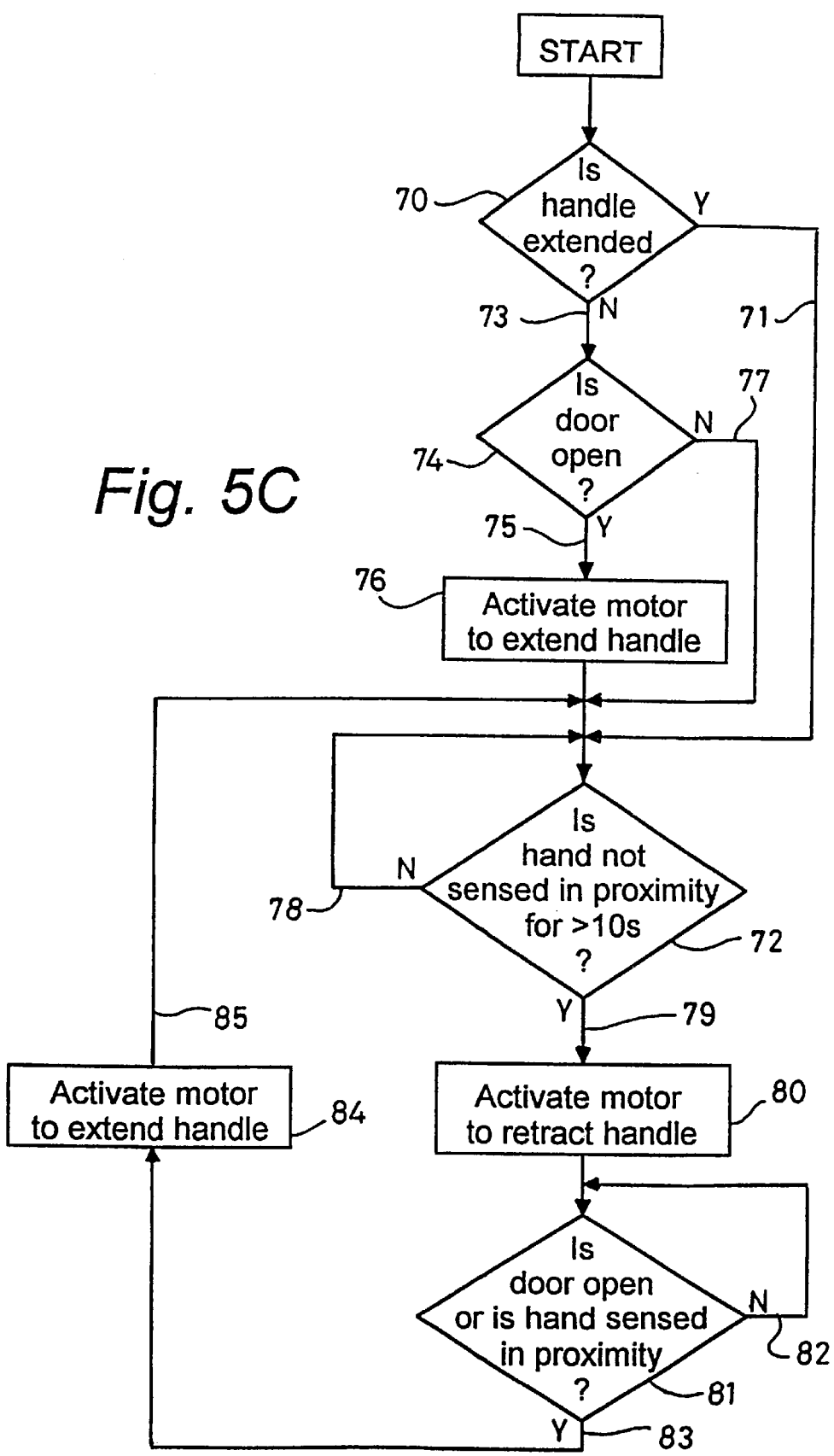
FIG. 5C is a flow chart showing how the grab handle of FIG. 5A operates.

FIG. 5C shows how the grab handle 206, according to this embodiment, operates under the control of computer software running in the microprocessor 232. The microprocessor 232 first tests, at step 70, from the signal 64 received from the electric motor 251, whether or not the grab handle 206 is in the extended position. If the grab handle is extended, then the computer software jumps, at 71, to check, at step 72, if a hand has not been sensed sufficiently near or proximate to any one of the sensors 222 for more than ten (10) seconds. Otherwise, if the computer program determines, at 73, that the grab handle 206 is not extended, the computer software next tests, at step 74, from the signal 66 received from the door sensor 65 whether or not the door 4 is opened or closed. If the computer program determines, at 75, that the door 4 is opened 75, then it is necessary to extend the grab handle 206 so that a passenger may use the grab handle 206 to help gain access into or exit from the vehicle 1. Accordingly, the microprocessor 232 sends a control signal 252, at step 76, to activate the motor 251 and extend the grab handle 206 into its extended position. Otherwise, if the door 4 is not opened, the software jumps, at 77, to step 72 to test whether or not a hand has not been sensed sufficiently near or proximate to the grab handle 206 for more than ten (10) seconds. If a hand has been sensed sufficiently near or proximate to the grab handle 206 within this period of time, then the computer software loops back, at 78, to again repeat this test at step 72. Otherwise, if a hand has been away from proximity to the grab handle 206 for more than ten (10) seconds, then the computer software, running on the microprocessor 232, determines, at 79, that the grab handle 206 is no longer needed, and thus sends a control signal 252 to the motor 251, at step 80, to activate the motor 251 and retract the grab handle 206.

Once the grab handle 206 is retracted into its retracted position within the recess 208, the computer software tests, at step 81, if the door 4 has been opened or if a hand has been sensed sufficiently near or proximate to any one of the infrared sensors 222. If this test is negative, then the software loops back, at 82, to again repeat this test, at step 81, until the test is affirmative, at 83, indicating that the grab handle 206 may be needed by a passenger of the vehicle 1. The microprocessor 232 then sends a control signal 252 to the motor 251, at step 84, to activate the motor 251 to extend the grab handle 206 to its extended position. Next, the computer software loops back, at 85, to the step 72 as discussed above.

The different embodiments of the present invention described above provide various levels of functionality and convenience for a grab handle. The first embodiment, shown in FIG. 3A, is relatively inexpensive to manufacture, as it contains no electric motor but only an activatable catch 21. The grab handle 6 is automatically extended using energy stored in the coil spring 20 when a passenger presses or forces the grab handle 6 back into the recess 8.

The second embodiment of the present invention, shown in FIG. 4A, uses an electric motor 51 to power the grab handle 106 when this is extended. Retraction of the grab handle 106 is powered by the spring bias force provided by the coil spring 120. The motion of the grab handle 106 is, therefore, fully automatic in both directions of movement.

The third embodiment of the grab handle, shown in FIG. 5A, is also fully automatic in both directions of motion and provides an additional degree of convenience by automatically extending the grab handle when a passenger may be entering into or leaving from the passenger compartment 12 of the vehicle 1.

According to the above description and appended drawings, all three embodiments of the present invention fully retract into the headlining 10 to provide maximum headroom clearance when use of the grab handle 6,106 or 206 is not needed or required.

Preferably the ultrasonic waves 28, the electric field 50 or the infrared light is directed downwardly into the vehicle compartment in a direction substantially parallel to a plane defined by the window and the door. When the ultrasonic waves 28, the electric field 50 or the infrared light are so directed, this minimizes the possibility that the proximity sensor will falsely detect a hand and generate a signal which causes deployment of the grab handle 6, into its extended position, when the grab handle 6 is not, in fact, required. In addition, preferably the proximity sensor will continuously monitor the environment by continuously pulsing or transmitting ultrasonic waves, electric fields or infrared light into the vehicle compartment or will designed to pulse or transmit ultrasonic waves, electric fields or infrared light at a frequency of greater than 2 hertz. According to a preferred form of the invention, the proximity sensor will be able to detect a hand of a passenger when the hand is located at a distance of from about 2 to 4 inches or so from the ultrasonic sensor/grab handle.

Since certain changes may be made in the above described grab handle and handle actuation mechanism, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A motor vehicle comprising:
   a vehicle compartment;
   a grab handle;
   a surface extending about the grab handle with the surface being located within the compartment;
   a handle support carried by the surface, the grab handle being movably attached to the handle support so that the grab handle may be one of moved away from the surface to an extended position, to facilitate grabbing of the grab handle by a passenger of the vehicle, and moved toward the surface to a stowed retracted position;
   a proximity sensor for sensing a presence of a hand when located sufficiently near the grab handle; and
   an actuator coupled to the grab handle and to the proximity sensor for moving the grab handle in response to sensing by the proximity sensor;
   wherein the actuator automatically extends the grab handle when the proximity sensor senses the presence of a hand sufficiently near the grab handle.

2. The motor vehicle according to claim 1, wherein the actuator is controlled to automatically retract the grab handle when the proximity sensor does not sense, for a predetermined period of time, the presence of a hand sufficiently near the grab handle.

3. The motor vehicle according to claim 2, wherein the actuator is electrically powered to drive the grab handle toward the retracted position once the proximity sensor no longer senses, for a predetermined period of time, the presence of a hand near the grab handle.

4. The motor vehicle according to claim 3, wherein the actuator biases the grab handle toward the extended position, a retention mechanism is provided for retaining the grab handle in the retracted position, and the retention mechanism is released once the proximity sensor senses a hand sufficiently near the grab handle.

5. The motor vehicle according to claim 1, wherein the actuator is electrically powered to drive the grab handle toward the extended position when the proximity sensor senses the presence of a hand sufficiently near the grab handle.

6. The motor vehicle according to claim 1, wherein the actuator both automatically extends the grab handle, when the proximity sensor senses the presence of a hand sufficiently near the grab handle, and automatically retracts the grab handle, when the proximity sensor does not sense the presence of a hand sufficiently near the grab handle for a predetermined period of time, and the extension motion of the grab handle occurs faster than the retraction motion of the grab handle.

7. The motor vehicle according to claim 1, wherein the grab handle is moved into the retracted position by a passenger pressing the grab handle toward the surface.

8. The motor vehicle according to claim 5, wherein the actuator biases the grab handle toward the retracted position, a retention mechanism is provided for retaining the grab handle in the extended retracted position, and the retention mechanism is released when the proximity sensor no longer senses a hand sufficiently near the grab handle for a predetermined period of time.

9. The motor vehicle according to claim 1, wherein the actuator comprises a damper to control movement of the grab handle toward the extended position of the grab handle.

10. The motor vehicle according to claim 1, wherein the grab handle is stored flush with the surface when the grab handle is in the retracted position.

11. The motor vehicle according to claim 1, wherein the proximity sensor is supported by the grab handle.

12. The motor vehicle according to claim 1, wherein the proximity sensor is an ultrasonic sensor.

13. The motor vehicle according to claim 1, wherein the proximity sensor is a capacitance sensor.

14. The motor vehicle according to claim 1, wherein the actuator moves the grab handle to the retracted position only once the sensor no longer senses a hand near the grab handle for a predetermined period of time.

15. The motor vehicle according to claim 14, wherein the predetermined period of time is between one to ten seconds.

16. The motor vehicle according to claim 14, wherein a duration of the predetermined period of time is increased if a door associated with the grab handle is opened during the predetermined period of time.

17. The motor vehicle according to claim 1, wherein the actuator automatically extends the grab handle to the extended position whenever a door associated with the grab handle is opened.

18. The motor vehicle according to claim 1, wherein the proximity sensor is arranged to sense the presence of the hand of the passenger when the hand is located is located at a distance of about 4 inches or less from the proximity sensor.

19. A motor vehicle having a vehicle compartment, and the vehicle compartment comprising:

a surface being located within the compartment;

a handle support means carried by surface;

a grab handle means being coupled to the surface by the handle support means for movement away from the surface to an extended position, to facilitate grabbing of the grab handle means by a passenger of the vehicle, and for movement toward the surface to facilitate storage of the grab handle means in a stowed retracted position;

a proximity sensor means for sensing when a hand of a passenger is located sufficiently near the grab handle means;

an actuator means electrically coupled to the proximity sensor means for moving the grab handle means when the proximity sensor means senses the hand of the passenger sufficiently near the grab handle means; and a computer means, coupled to the proximity sensor means and the actuator means, for controlling operation of the actuator means;

wherein the actuator means automatically extends the grab handle, to the extended position, when the proximity sensor senses the presence of the hand sufficiently near the grab handle means.

20. A motor vehicle having a vehicle compartment, and the vehicle compartment comprising:

a surface being located within the compartment;

a handle support carried by surface;

a grab handle being coupled to the surface by the handle support for movement away from the surface to an extended position, to facilitate grabbing of the grab handle by a passenger of the vehicle, and for movement toward the surface to facilitate storage of the grab handle in a stowed retracted position;

a proximity sensor for sensing when a hand of a passenger is located sufficiently near the grab handle;

an actuator electrically coupled to the proximity sensor for moving the grab handle when the proximity sensor senses the hand of the passenger sufficiently near the grab handle; and a computer, coupled to the proximity sensor and the actuator, for controlling operation of the actuator in response to sensing of the hand by the proximity sensor;

wherein the actuator automatically extends the grab handle, to the extended position, when the proximity sensor senses the presence of the hand at a distance of about 4 inches or less from the proximity sensor.

* * * * *